United States Patent [19]

Jungles-Butler et al.

[11] Patent Number: 5,577,267
[45] Date of Patent: Nov. 19, 1996

[54] ASSEMBLY FOR VISUALLY INDICATING SIGNALS GENERATED BY AN ELECTRICAL CIRCUIT AND LIGHT-DIFFUSING INTERFACE APPARATUS THEREFOR

[75] Inventors: Polly Jungles-Butler, Gilberts; Daniel J. Repplinger, Lake Zurich, both of Ill.

[73] Assignee: Motorola, Inc., Schaumburg, Ill.

[21] Appl. No.: 966,659

[22] Filed: Oct. 26, 1992

[51] Int. Cl.⁶ .................................................. H04B 1/38
[52] U.S. Cl. .......................... 455/90; 455/128; 455/351
[58] Field of Search ............................. 455/89, 90, 95, 455/128, 157.1, 157.2, 159.1, 347, 351, 344, 159.2; 340/815.45, 815.5, 815.55, 815.73, 815.75; 361/679, 680, 760, 807, 809, 814, 220; 200/310, 311, 314, 317, 312, 313, 514; 40/544; 362/31, 800, 351, 235, 244; 313/512; 345/32; 341/22, 27; 264/230; 359/623; 331/94.5

[56] References Cited

U.S. PATENT DOCUMENTS

| | | | |
|---|---|---|---|
| 3,670,260 | 6/1972 | Koester et al. | 331/94.5 |
| 4,271,408 | 6/1981 | Teshima et al. | 340/815.17 |
| 4,371,575 | 2/1983 | Kerk et al. | 264/230 |
| 4,503,563 | 3/1985 | Johnson | 455/344 |
| 4,876,709 | 10/1989 | Rogers et al. | 455/89 |
| 5,210,532 | 5/1993 | Knoedler et al. | 455/90 |

FOREIGN PATENT DOCUMENTS 3541774  5/1987  Germany .......................... 340/865.15

*Primary Examiner*—Andrew Faile
*Assistant Examiner*—Nguyen Vo
*Attorney, Agent, or Firm*—Kevin D. Kaschke

[57] ABSTRACT

An assembly for visually indicating signals generated by an electrical circuit and a light diffuser therefor. Light emitting diodes disposed upon a circuit board and housed within a housing structure are connected to an electrical circuit and generate light responsive to signals generated by the electrical circuit. A sheet of translucent material having a spine-portion and toothed-portion extending therefrom is positioned upon the circuit board portion at which the light emitting diodes are disposed. Light diffusers comprised of truncated, conical bodies protrude beyond top surfaces of each of the toothed-portions and correspond in number and spacing with the light emitting diodes disposed upon the circuit board. Apertures are formed to extend through the housing assembly and top end portions of the light diffusers are visible from beyond the housing assembly. The light diffusers diffuse the light generated by the light emitting diodes to form a uniformly-lighted indication of times in which such diodes are lighted.

20 Claims, 3 Drawing Sheets

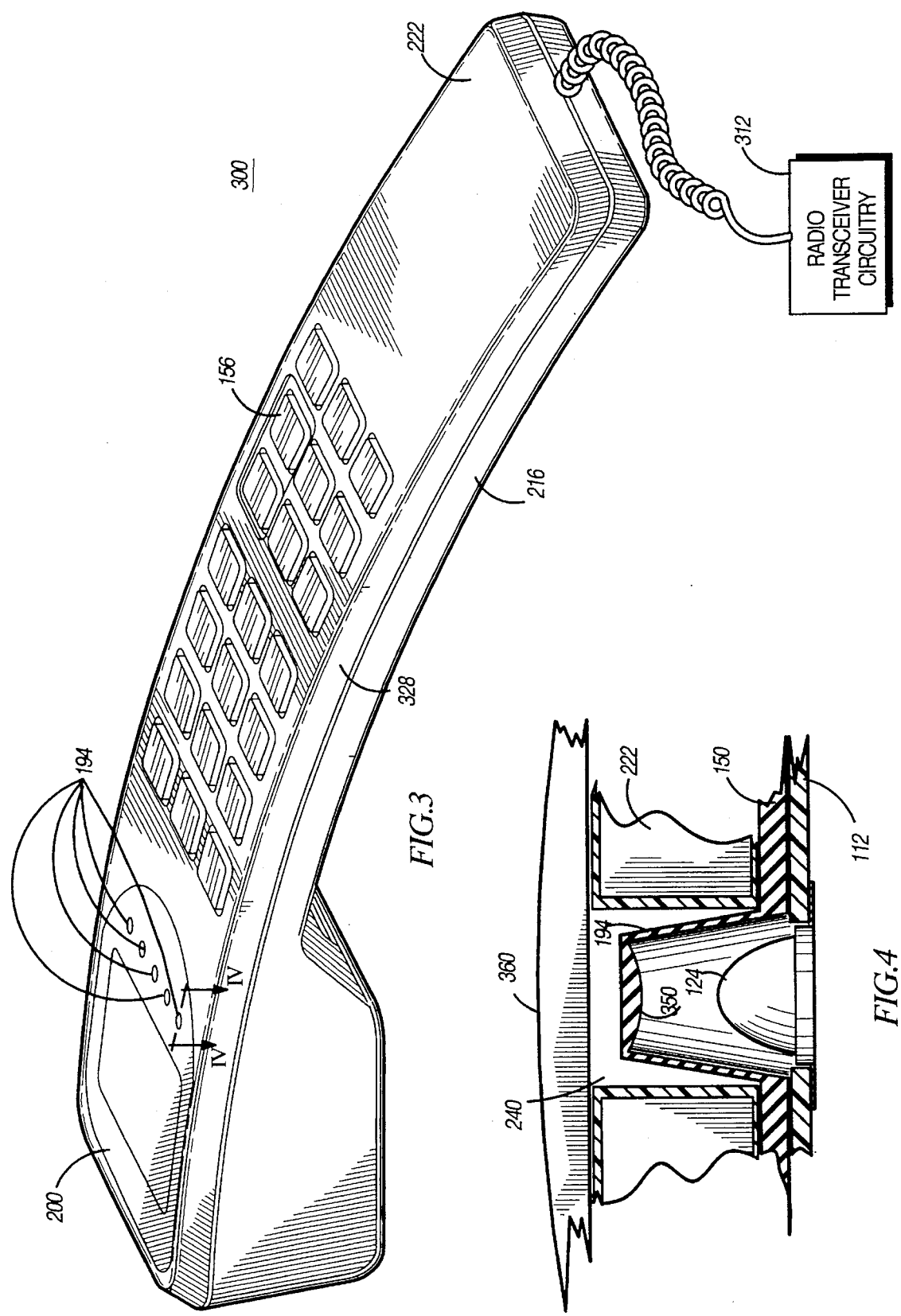

1

ASSEMBLY FOR VISUALLY INDICATING SIGNALS GENERATED BY AN ELECTRICAL CIRCUIT AND LIGHT-DIFFUSING INTERFACE APPARATUS THEREFOR

BACKGROUND OF THE INVENTION

The present invention relates generally to light diffusers and, more particularly, to a light-diffusing interface apparatus for diffusing light generated by a light-generative device.

A communication system is operative to transmit information between two or more locations, and includes, at a minimum, a transmitter and a receiver interconnected by a communication channel. In a radio communication system, the communication channel comprises a radio frequency channel wherein a radio frequency channel is defined by a range of frequencies of the communication spectrum. Information is transmitted by the transmitter to the receiver by transmitting the information upon the radio frequency channel to the receiver.

The transmitter which forms a portion of the radio communication system includes circuitry for converting the information into a form suitable for transmission thereof upon a radio frequency channel. Such circuitry includes modulation circuitry which performs a process referred to as modulation. In such modulation process, the information which is to be transmitted is impressed upon a radio frequency electromagnetic wave, commonly referred to as a carrier signal. The resultant signal, formed of a combination of the carrier signal and the information, is commonly referred to as a modulated signal. Such resultant signal is also referred to as a communication signal as the modulated signal includes the information which is to be communicated by the transmitter to the receiver.

Various types of modulation schemes have been devised for impressing the information upon the carrier signal, thereby to form the communication signal. For instance, amplitude modulation, frequency modulation, phase modulation, and combinations of such modulation schemes are all modulation schemes by which the information may be impressed upon the carrier wave to form the communication signal.

Radio communication systems are advantageous in that no physical interconnection is required between the transmitter and the receiver; once the information is modulated to form a modulated signal, a modulated signal may be transmitted over large distances.

Numerous modulated signals may be simultaneously transmitted upon different radio frequency channels defined upon the electromagnetic frequency spectrum. Transmission of modulated signals on different ones of the radio frequency channels defined upon certain frequency bands of the electromagnetic frequency spectrum is regulated by regulatory bodies.

A two-way, radio communication system is a radio communication system, similar to the radio communication system above-described, but which further permits both transmission and reception of information at first and second, spaced-apart locations. Each location of a two-way radio communication system contains both a transmitter and a receiver. The transmitter and the receiver positioned at a single location typically comprise a unit referred to as a radio transceiver, or, more simply, a transceiver. A transceiver capable of alternate operation either to transmit or to receive a communication signal is referred to as being capable of simplex operation. A transceiver capable of simultaneous operation both to transmit and to receive a communication signal is referred to as being capable of duplex operation.

A cellular communication system is one type of two-way radio communication system in which communication is permitted with a radio transceiver positioned at any location within a geographic area encompassed by the cellular communication system.

A cellular communication system is created by positioning a plurality of fixed-site radio transceivers referred to as base stations, at spaced-apart locations throughout the geographic area. The base stations are connected to a conventional, wireline, telephonic network. Each base station has associated therewith a portion of the geographic area located proximate to each of such base stations. Such portions are referred to as cells. The plurality of cells, each defined by corresponding ones of the base stations of the plurality of base stations together define the coverage area of the cellular communication system.

A radio transceiver, referred to in the cellular communication system as a radiotelephone, positioned within any location within the coverage area of the cellular communication system is able to communicate with a user of the conventional, wireline, telephonic network by way of a base station. Modulated signals are transmitted between the radiotelephone and the base station to effectuate communication therebetween.

Typically, the radiotelephone includes a handset assembly operative in a manner analogous to the operation of a handset assembly of conventional telephonic apparatus.

In some radiotelephone constructions, only portions of the circuitry of the radiotelephone is disposed within the handset assembly, In such constructions, the handset assembly is coupled to transceiver circuitry housed within other structure. In other radiotelephone constructions, the entire circuitry of the radiotelephone is housed within the handset assembly thereof.

In either type of radiotelephone construction, however, the handset assembly includes structure to facilitate operation of the radiotelephone. As such structure typically requires the interaction of a user, such structure is typically referred to as a user interface.

For instance, the handset assembly of either type of radiotelephone includes a user interface which permits the user to effectuate telephonic communication by way of the radiotelephone with a remote site. Such user interface typically comprises a telephonic keypad to permit the user to enter a desired call sequence (i.e., a telephone number) thereby to effectuate telephonic communication with a location associated with such call sequence.

Additionally, information is provided by the radiotelephone to indicate to the user of such radiotelephone certain parameters of operation of such radiotelephone. Typically, such information is provided in the form of a visual indication by light-generative devices, usually light emitting diodes.

Light emitting diodes are advantageously utilized to provide the indications to the user of the parameters of operation of the radiotelephone as the light emitting diodes are operable at low power levels. Use of such light emitting diodes is particularly advantageous when the radiotelephone is powered by a portable power source.

Diodes generate a nondiffuse light pattern. Because of this characteristic, many designs of radiotelephone constructions position the diodes near the surface of the housing of the handset assembly, thereby to ensure that the light generated by such diodes is noticeable to the user of the radiotelephone.

Radiotelephones are oftentimes operated in darkened conditions. To facilitate operation of such radiotelephones in the darkened conditions, the keypad supported by the handset assembly oftentimes also includes light-generative devices, once again typically formed of light emitting diodes, for illuminating the keypad display.

In some radiotelephone constructions, the keypad display is comprised of a thermoelastic, and also translucent, material. The thermoelastic and translucent material may, for example, be comprised of a silicone rubber-type material. The light emitting diodes forming the light-generative devices which illuminate the keypad display are positioned beneath individual actuation switches of the keypad display. The translucent keypad acts to diffuse the point-intensive light pattern of the light generated by the light emitting diodes. When the diodes are lighted, the diffusion of the light caused by the keypad display causes the entire keypad display to be illuminated.

Positioning of a similar such translucent material upon the light emitting diodes utilized to indicate the certain parameters of operation of the radiotelephone to the user thereof would also be advantageous to the user.

However, such additional piece of translucent material increases the piece-part count of the radiotelephone. The increased piece-part count increases not only the product part cost of the radiotelephone, but also increases the number of assembly steps required to assemble such radiotelephone.

When more than one proximately-positioned light emitting diode (or other light generative device) are separately lighted by the circuitry of the radiotelephone to provide indications of different parameters of operation of the radiotelephone, confusion as to which of the light emitting diodes is lighted can occur. Transmission of the light generated by the proximately-positioned diodes through the translucent material resulting in confusion as to which of the diodes (or other light-generative devices) is lighted is undesirable. Such undesired transmission is sometimes referred to as light bleed. Light bleed resulting in confusion as to which of more than one proximately-positioned diodes is lighted should be minimized.

What is needed is a light-diffusing interface apparatus for diffusing light generated by light-generative devices for an electronic device which does not increase the product part count of the electronic device and which minimizes light bleed between adjacently-positioned light-generative devices.

SUMMARY OF THE INVENTION

The present invention, accordingly, advantageously provides a light-diffusing interface apparatus for diffusing light generated by a light generative device.

The present invention further advantageously provides an assembly for visually indicating signals generated by an electrical circuit.

The present invention yet further advantageously provides an interface apparatus for a radio transceiver.

The present invention contains further advantages and features, the details of which will become more apparent when reading the following detailed description of the preferred embodiments.

In accordance with the present invention, therefore, an assembly for visually indicating signals generated by an electrical circuit is disclosed. The assembly comprises at least two light-generative devices coupled to the electrical circuit wherein a first light-generative device of the at least two light-generative devices is operative to turn-on when a first of the signals is generated by the electrical circuit. A second light-generative device of the light-generative devices is spaced apart from the first of the light-generative devices and is operative to turn-on when a second of the signals is generated by the electrical circuit. A sheet of translucent material is positioned above both the first and second light-generative devices, respectively, of the at least two light-generative devices. At least two spaced-apart light diffusers formed of the translucent material comprising the sheet of translucent material is positioned to extend beyond a top surface of the sheet of the translucent material. A first light diffuser and a second light diffuser of the at least two light diffusers are spaced-apart by distances corresponding to distances at which the first and second light-generative devices, respectively, are spaced-apart, thereby to permit alignment of the first light diffuser with the first light-generative device and alignment of the second light diffuser with the second light-generative device. Light emitted by the first and second light-generative devices, respectively, are diffused by corresponding ones of the first and second light diffusers.

BRIEF DESCRIPTION OF THE DRAWINGS

The present invention will be better understood when read in light of the accompanying drawings in which:

FIG. 3 is a perspective view of a radiotelephone of a preferred embodiment of the present invention which incorporates the assembly of the preceding figures as a portion thereof; and FIG. 4 is a sectional view taken along lines IV—IV of FIG. 3.

DESCRIPTION OF THE PREFERRED EMBODIMENTS

At the outset, it should be noted that, while the assembly of the preferred embodiment of the present invention is described in connection with a radio transceiver such as a radiotelephone operative in a cellular communication system, the teachings of the present invention are similarly applicable for use in other devices and other applications.

Figure 1:
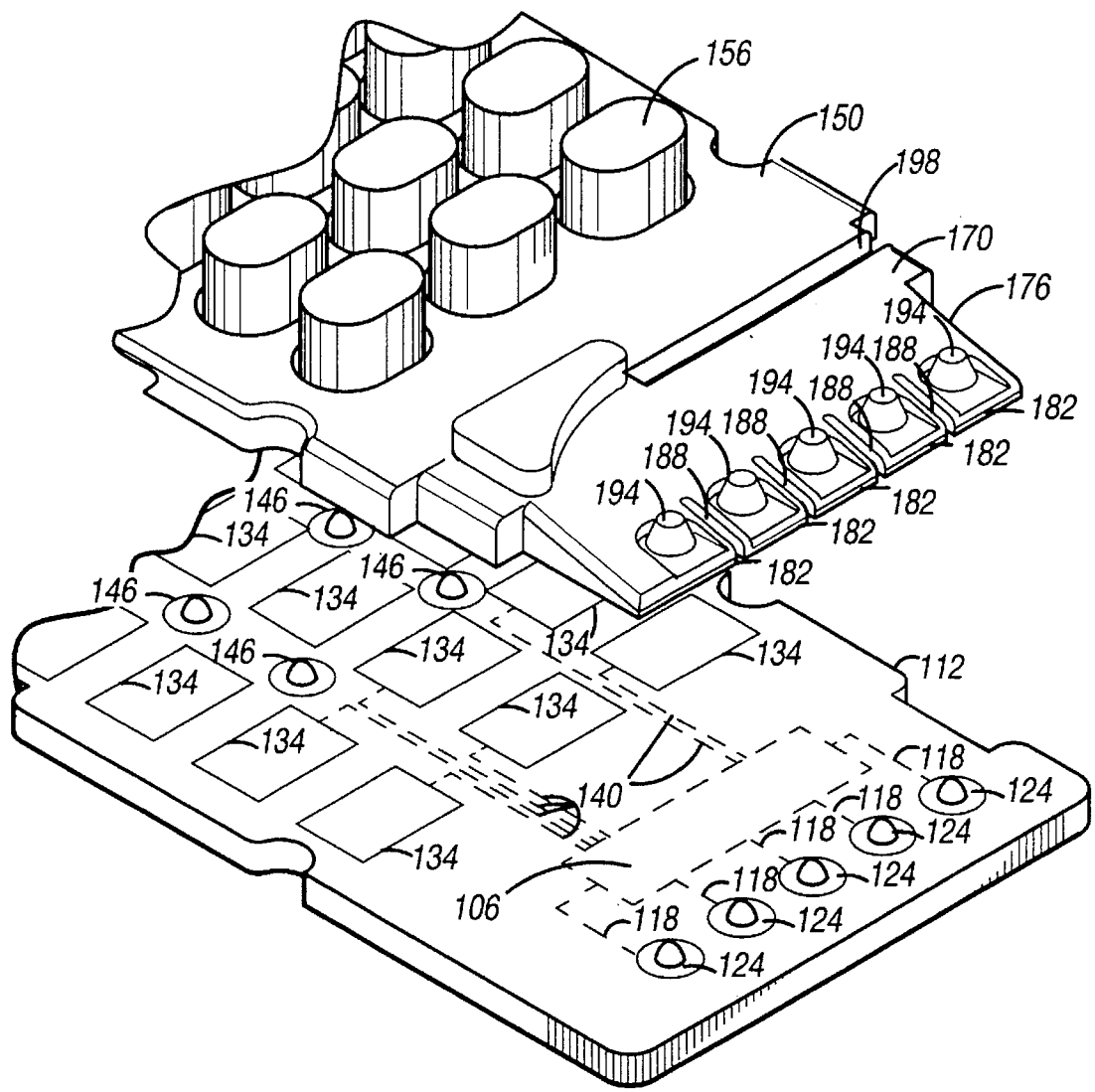
FIG. 1 is an exploded, cutaway view of the assembly of a preferred embodiment of the present invention for visually indicating signals generated by an electrical circuit.

Turning first, then, to the exploded, cutaway view of FIG. 1, the assembly, referred to generally by reference numeral 100, of a preferred embodiment of the present invention is shown. Assembly 100 is operative to indicate visually signals generated by an electrical circuit. Here, the electrical circuit is represented by block 106, shown in hatch, which is disposed primarily upon a bottom surface of circuit board 112.

Electrical circuit 106 generates signals on lines 118 (here five lines 118 are shown) which lead to light-generative devices 124. In the preferred embodiment of the present invention, light-generative devices 124 are comprised of light emitting diodes.

Circuit board 112 of FIG. 1 is further shown to include an array of input terminals 134 at which input signals are applied, thereafter to be supplied to electrical circuit 106 by way of lines 140. As illustrated, input terminals 134 are arranged in rows and columns to form an array of terminals. Additional light-generative devices 146 are further disposed upon circuit board 112. Light-generative devices 146 are also preferably comprised of light emitting diodes and are also connected to electrical circuit 106 by electrically-conductive lines (not shown in the figure).

Keypad interface 150 is positioned above a top face surface of circuit board 112 and is of dimensions permitting tandem positioning of a face surface of keypad interface 150 upon the top face surface of circuit board 112. Keypad interface 150 includes a plurality of keypad push buttons 156 arranged in rows and columns to form an array of keypad pushbuttons. Individual ones of the keypad pushbuttons 156 are spaced-apart by distances corresponding to distances at which input terminals 134 are spaced-apart upon the top face surface of circuit board 112.

Keypad interface 150 is comprised of a flexible, thermoelastic material and is constructed to permit limited vertical translation of individual ones of the keypad pushbuttons 156. In the preferred embodiment, keypad interface 150 is comprised of a silicone rubber-type material. The thermoelastic material comprising keypad interface 150 is preferably translucent and is both light-diffusive and light-transmissive. (Keypad pushbuttons 156, also comprised of the silicone rubber-type material are similarly both light-diffusive and light-transmissive.)

An electrically-conductive material is coated upon bottom portions (not shown in FIG. 1) of the keypad pushbuttons 156. When a bottom face surface of keypad interface 150 is aligned with circuit board 112 and is positioned upon the front face surface of circuit board 112, individual ones of the keypad pushbuttons 156 of the array of pushbuttons 156 are aligned with corresponding ones of the input terminals 134 of the array of input terminals 134.

Keypad pushbuttons 156 are actuated by application of a downward translation force upon face surfaces of individual ones of keypad pushbuttons 156. Translation of keypad pushbuttons 156 responsive to application of such actuation force thereto causes the bottom portions of such keypad pushbuttons 156, coated with the electrically-conductive material, to abut against input terminals 134. Such abutment of the electrically-conductive coating upon adjoining input terminals 134 closes contacts comprising each of the terminals 134 and thereby form the input signals applied to electrical circuit 106.

Keypad pushbuttons 156 are arranged in a configuration corresponding to the configuration of a conventional, telephonic keypad and are operative to permit manual entry of a desired call sequence corresponding to a telephone number to be entered by a user.

Sheet 170 is formed integral with keypad interface 150 to extend beyond a top edge surface thereof. Sheet 170 is comprised of the same thermoelastic material of which keypad interface 150 is comprised. Again, in the preferred embodiment, sheet 170, integrally formed with keypad interface 150, is comprised of the silicone rubber-type material. The thermoelastic material comprising sheet 170 is also translucent to be both light transmissive and light-diffusive thereby. Sheet 170 is of like a comb-like configuration forming a spine-portion 176 with toothed-portions 182 extending therefrom. In the embodiment of FIG. 1, five toothed-portions extend beyond spine-portion 176. Adjacent ones of the tooth-portions 182 are spaced-apart from each other to define thereby gaps 188 therebetween.

Light diffusers 194 are formed to extend beyond a top face surface of each tooth-portion 182 of sheet 170 and are comprised of the same material as that of sheet 170 and keypad interface 150. As illustrated, light diffusers 194 are conically-shaped and have truncated top ends. Each light diffuser 194 forms a truncated conical body thereby. While diffusers 194 are integrally formed with sheet 170, the diffusers are formed to be of thicknesses less than the thickness of sheet 170 (and also keypad interface 150) thereby to be more greatly light-transmissive (and less light-diffusive) than sheet 170 (and keypad interface 150).

Individual ones of the toothed-portions 182 are spaced apart by distances such that when keypad interface 150 is positioned in tandem with the top face surface of circuit board 112 to align keypad pushbuttons 156 with corresponding input terminals 134, light diffusers 194 formed upon the individual ones of the toothed-portions 182 align with individual ones of the light-generative devices 124. Once positioned as such, light emitted by individual ones of the light-generative devices 124 pass through a corresponding light diffuser 194 positioned thereabove.

As light diffusers 194 are operative to diffuse the light directed thereat, light generated by individual ones of the light generative devices 124 is diffused by a light diffuser 194 positioned thereabove, and the entire surface area of the particular one of the light diffusers 194 positioned over top the particular light-generative device 124 is illuminated.

Because gaps 188 are formed between adjacent ones of toothed-portions 182, light generated by any particular ones of the light-generative devices 124 is transmitted through only the toothed-portion 182 and the associated light diffuser 194 positioned thereabove; such light is not transmitted to an adjacent one of the toothed-portions 182.

Unwanted transmission of light resulting in the aforementioned light bleed of light generated by any particular one of the light-generative devices 124 is thereby minimized as only insignificant amounts of light are transmitted across the separate boundaries of the translucent, thermoelastic material comprising sheet 170 and the toothed-portions 182 comprising portions thereof. It should be noted that, as noted hereinabove, because the thicknesses of diffusers 194 are less than the thickness of sheet 170, diffusers 194 are more light transmissive than sheet 170, light diffusers 194 appear to channel and to focus the light generated by light generative devices positioned therebeneath.

Transversely-extending channel 198 formed proximate to the intersection between keypad interface 150 and sheet 170 extends across a substantial portion of the distance between opposing side surfaces of keypad interface 150 and sheet 170. While not shown in the view of FIG. 1, a similar such channel (spaced somewhat apart from that of channel 198) is formed to extend transversely along a bottom side of the structure proximate to the intersection of keypad interface 150 and sheet 170.

Such channels are operative to minimize undesired transmission of light (i.e., light bleed) through the thermoelastic material comprising interface 150 and sheet 170 of light generated by either any of the light-generative devices 124 or light-generative devices 146.

Figure 2:
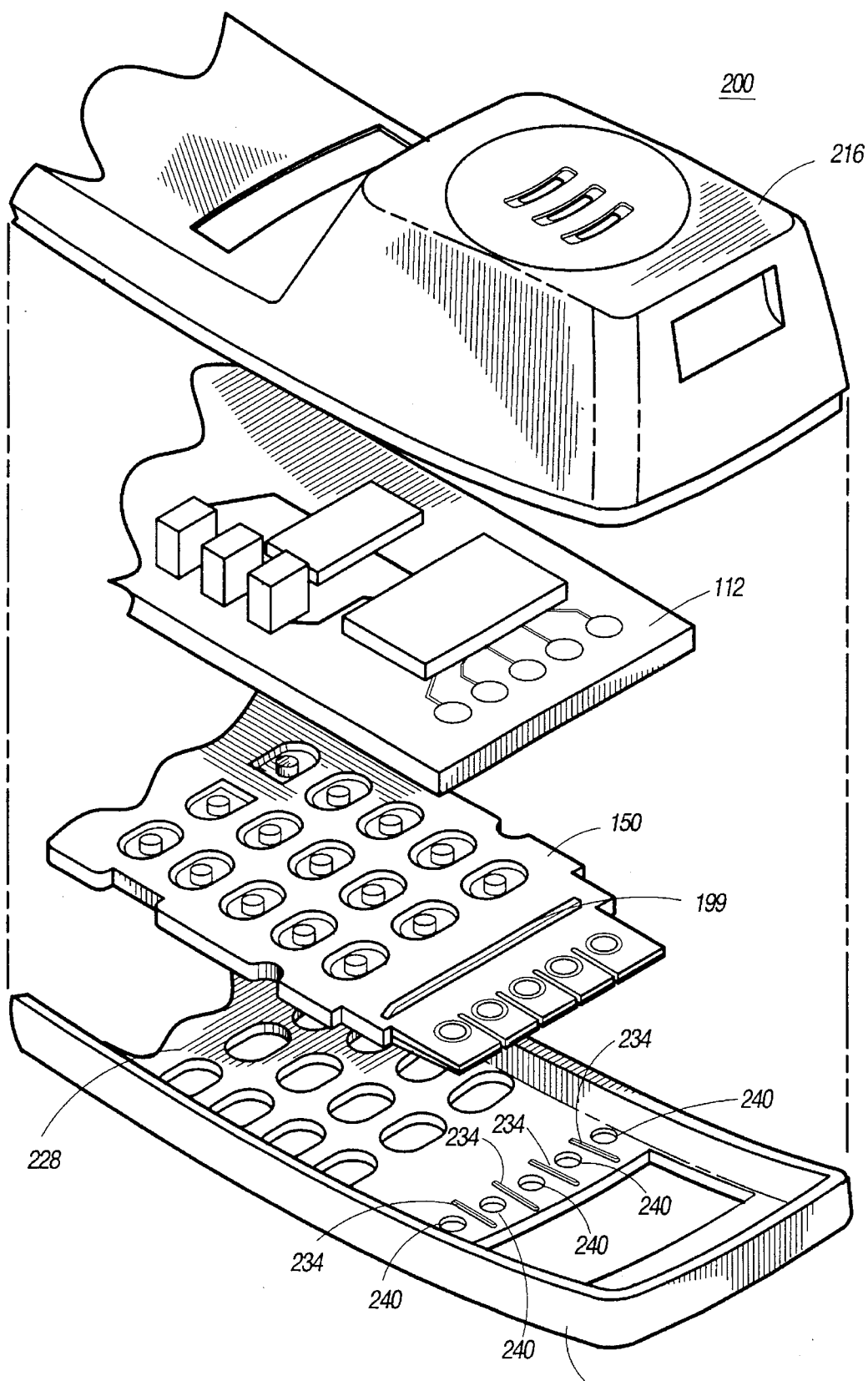
FIG. 2 is an exploded, cutaway view of the assembly of FIG. 1 positioned to form a portion of a telephonic handset assembly.

Turning next to the cutaway view of FIG. 2, a portion of handset assembly 200 is shown in exploded form. Assembly 100 of FIG. 1 forms a portion of handset assembly 220.

Accordingly, commonly-numbered circuit board 112, keypad interface 150 and sheet 170 extending from a top edge surface thereof form portions of handset assembly 200.

The view of FIG. 2 illustrates the face surface of circuit board 112 hidden from view in FIG. 1 upon which substantial portions of electrical circuit 106 are disposed as well as lines 118 which extend to light-generative devices 124.

Keypad interface 150 is again shown to include keypad pushbuttons 156 which are arranged to form an array of pushbuttons 156. And, the plurality of toothed-portions 182 and light diffusers 194 are also again shown in the figure. The view of FIG. 2 further illustrates transversely-extending channel 199 which forms the channel, noted briefly hereinabove, which is substantially similar to that of channel 198 shown FIG. 1.

Handset assembly 200 is further shown to include handset housing portions 216 and 222. Handset housing portions 216 and 222 are of dimensions permitting supportive housing therewithin of, inter alia, circuit board 112, keypad interface 150, and sheet 170.

An inner wall 228 of handset housing portion 222 is further illustrated in the view of the figure. A plurality of spaced-apart, longitudinally-extending rib members 234 are formed upon inner wall 228. Rib members 234 are spaced-apart by distances corresponding to the widths of toothed-portions 182 of sheet 170 (and, hence, also to the distances separating gaps 188 formed at opposing sides of toothed-portions 182). Such spacing of rib members 234 thereby permits interfitting engagement of such rib members 234 with toothed-portions 182 when such toothed-portions 182 are suitably aligned therewith. Rib members 234 are operative thereby to support toothed-portions 182 in position. Also, as rib members 234 are comprised of an opaque material, the rib members are operative to prevent undesired transmission of light (i.e., light bleed) generated by light-generative devices 124 once circuit board 112 and keypad interface 150 are tandemly positioned and toothed-portions 182 and rib members 234 are positioned in the interfitting engagement therebetween.

Apertures 240 are formed to extend through handset housing portion 222 at locations between adjacent ones of the rib members 234. Apertures 240 extend the entire distances between inner wall 228 of housing portion 222 and a corresponding outer wall of the housing portion. Apertures 240 are of diameters permitting insertion therein of portions of light diffusers 194. Apertures 240 are thereby operative to support light diffusers 194 in position once toothed-portions 182 are positioned in the interfitting engagement with rib members 234.

By suitable selection of the dimensions of handset housing portion 222 as well as the heights of light diffusers 194, the top edge surfaces of the truncated, conical bodies forming light diffusers 194 may be positioned flush with an outer wall of handset housing portion 222 once the light diffusers 194 are positioned to extend into apertures 240. Because light diffusers 194 are operative to diffuse the light generated by light-generative devices 124, a uniformly-lighted circular area corresponding to the top edge surface of a light diffuser 194 appears at the outer wall of handset housing portion 222 when a light-generative device 124 is lighted. Because of gaps 182 positioned between adjacent toothed-portions 182, opaque rib members 234, and channels 198 and 199, light bleed of light transmitted through the translucent material comprising sheet 170 and light diffusers 194 is insignificant.

Turning next to FIG. 3, a radiotelephone, referred to generally to reference numeral 300, of a preferred embodiment of the present invention is shown in partial-perspective, partial-block form. Radiotelephone 300 includes commonly-numbered, housing assembly 200 shown in the exploded view of FIG. 2 as a portion thereof. Housing assembly 200 is again shown to be comprised of handset housing portions 216 and 222. Circuit board 112, keypad interface 150, and sheet 170 are supported within assembly 200.

Radiotelephone 300 further includes radio transceiver circuit 312 which is coupled to the circuitry, including circuit board 112, housed within handset assembly 200. It should be noted that, while radio transceiver circuitry 312 is illustrated in the figure as being located separate from handset assembly 200, radio transceiver circuitry 312 may also alternately be housed entirely within handset assembly 200. In such an embodiment, radiotelephone 300 forms a portable radiotelephone.

Outer wall 328 of handset housing portion 222, hidden from view in the view of FIG. 2, is illustrated in the perspective view of FIG. 3. Keypad pushbuttons 156 extend through openings formed to extend through handset housing portion 222 to be accessible by a user of radiotelephone 300. A user may utilize such keypad pushbuttons 156 to enter a call sequence corresponding to a telephone number by application of actuation forces upon individual ones of the keypad pushbuttons 156.

Apertures 240 and top end portions of light diffusers 194 are further illustrated in the perspective view of radiotelephone 300 of FIG. 3. Light generated by individual ones of the light-generative devices 124 shown in the preceding figures is diffused by a light diffuser 194 positioned thereupon, as described previously, thereby to provide a uniformly-lighted indication at the circular, top-end portion of the associated light diffuser 194 visible from the exterior of handset assembly 200. Because light bleed is insignificant, a mistaken indication of lighting of one or another of the light-generative devices is obviated.

Because sheet 170 is integrally formed with keypad interface 150, use of the light diffusers disposed thereupon is permitted while not increasing the product part count of radiotelephone 300. (Rib numbers 234 are also integrally formed with handset housing portion 222 and similarly do not increase the product part count of radiotelephone 300.) Accordingly, assembly of radiotelephone 300 including such light diffusers 194 is permitted without any increase in assembly complexity.

Finally turning now to the cross-sectional view of FIG. 4, a sectional view of a portion of handset assembly 200 taken along lines IV—IV of FIG. 3 is shown. The relationship between a single light-generative device 124 and a single light diffuser 194 is shown. Light generated by light-generative device 124 is diffused by light diffuser 194. As light diffuser 194 is inserted to extend into an aperture 240 extending through handset housing portion 222, only a top, end portion of light diffuser 194 is visible from beyond the handset assembly 200.

Top surface 350 of light diffuser 194 is positioned beneath lens 360 and is spaced apart therefrom by a slight distance for aesthetic reasons. (Positioning of top surface 350 is abutting engagement with a surface of lens 360 can result in an aesthetically displeasing appearance referred to as a "water effect.")

The thickness of top surface 350 is somewhat greater than sidewalls of diffuser 194 thereby to increase the amount of diffusion of light directed thereat by light-generative device 124 and may be of any desired thickness to cause a desired amount of light diffusion of light generated thereat.

While the present invention has been described in connection with the preferred embodiments of the various figures, it is to be understood that other similar embodiments may be made and modifications and additions may be made to the described embodiments for performing the same functions of the present invention without deviating therefrom. Therefore, the present invention should not be limited to any single embodiment, but rather construed in breadth and scope in accordance with the recitation of the appended claims.

What is claimed is:

1. An assembly for visually indicating signals generated by an electrical circuit, said assembly comprising:
    at least two light-generative devices wherein a first light-generative device of the at least two light-generative devices is operative to turn-on when a first of the signals is generated by the electrical circuit and wherein a second light-generative device of the light-generative devices is spaced-apart from the first of the light-generative devices and is operative to turn-on when a second of the signals is generated by the electrical circuit;
    a sheet of translucent material positioned above both the first and second light-generative devices, respectively, of the at least two light-generative devices; and
    at least two spaced-apart light diffusers formed of the translucent material comprising said sheet of translucent material and positioned to extend beyond a top surface of said sheet, wherein a gap is formed in the translucent sheet of material between adjacent ones of said at least two spaced-apart light diffusers, wherein a first light diffuser and a second light diffuser of said at least two light diffusers are spaced-apart by distances corresponding to distances at which the first and second light-generative devices, respectively, are spaced-apart, thereby to permit alignment of the first light diffuser with the first light-generative device and alignment of the second light diffuser with the second light-generative device such that light emitted by the first and second light-generative devices, respectively, are diffused by corresponding ones of the first and second light diffusers.

2. The assembly of claim 1 wherein said at least two light-generative devices are comprised of light emitting diodes.

3. The assembly of claim 1 wherein said sheet of translucent material comprises a sheet of thermoelastic material.

4. The assembly of claim 1 wherein said at least two spaced-apart light diffusers are integrally formed with said sheet of the translucent material.

5. The assembly of claim 1 wherein said at least two spaced-apart light diffusers are each formed of truncated conical bodies which protrude beyond the top surface of the sheet of translucent material.

6. The assembly of claim 1 wherein said sheet of translucent material is of a comb-like configuration having a spine-portion and toothed-portions extending therefrom with adjacent ones of said toothed-portions being spaced-apart from one another by distances such that, when suitably aligned, individual ones of said toothed-portions of the sheet of translucent material of the comb-like configuration are positioned above corresponding individual ones of light-generative devices of the at least two light-generative devices.

7. The assembly of claim 6 wherein a light diffuser of said at least two spaced-apart light diffusers is positioned to extend beyond a top surface of each of the toothed-portions of the sheet of translucent material of the comb-like configuration.

8. The assembly of claim 7 wherein a first light diffuser of said at least two spaced-apart light diffusers is positioned to extend beyond a top surface of a toothed-portion of the sheet of translucent material positioned above the first light-generative device and wherein a second light diffuser of said at least two spaced-apart light diffusers is positioned to extend beyond a top surface of a toothed-portion of the sheet of translucent material positioned above the second light-generative device.

9. The assembly of claim 6 further comprising means for supporting said sheet of translucent material and the at least two spaced-apart light diffusers extending above a top surface thereof in position above the at least two light-generative devices.

10. The assembly of claim 9 wherein said means for supporting comprises a housing positioned about the sheet of translucent material, the at least two light-generative devices and the electrical circuit to which the light-generative devices are coupled.

11. The assembly of claim 10 wherein said housing further comprises at least one rib member formed along an inner wall thereof for positioning individual ones of said at least one rib member in said gap formed between adjacent toothed-portions of the sheet of translucent material of the comblike configuration.

12. The assembly of claim 10 wherein said at least one rib member is comprised of an opaque material.

13. The assembly of claim 10 wherein said housing further comprises at least two spaced-apart apertures of diameters of dimensions permitting insertion of top end portions of the at least two light diffusers therein.

14. The assembly of claim 13 further comprising a shield having transparent portions for covering the at least two spaced-apart apertures.

15. In a radiotelephone having transceiver circuitry including circuit board-mounted circuitry operative to receive manually-input signals representative of a call sequence generated by way of a plurality of keypad pushbuttons integrally molded with a keypad interface, the keypad interface further having a face surface positioned in tandem with a face surface of the circuit board at which the circuitry operative to receive the manually-input signals is mounted, a combination with the transceiver circuitry and the keypad interface of an assembly for visually indicating selected signals generated by the transceiver circuitry, said assembly comprising:
    at least two light-generative devices coupled to the transceiver circuitry and disposed upon the face surface of the circuit board at which the circuitry operative to receive the manually-input signals is disposed, wherein a first light-generative device of the at least two light-generative devices is operative to turn-on when a first of the signals is generated by the transceiver circuitry and wherein a second light-generative device of the at least two light-generative devices is spaced-apart from the first of the light-generative devices and is operative to turn-on when a second of the signals is generated by the transceiver circuitry;
    a sheet of translucent material integrally molded with the keypad interface and extending beyond a top edge surface thereof for positioning above the first and second light-generative devices, respectively, of the at least two light-generative devices; and
    at least two spaced-apart, light diffusers integrally molded with the translucent material comprising said sheet of translucent material and positioned to extend beyond a top surface of said sheet wherein a first light diffuser and a second light diffuser of said at least two light diffusers are spaced-apart by distances corresponding to distances at which the first and second light-generative devices, respectively, are spaced-apart, thereby to permit alignment of the first light diffuser with the first light-generative device and alignment of the second light diffuser with the second light-generative device such that light emitted by the first and second light-generative devices, respectively, are diffused by corresponding ones of the first and second light diffusers.

16. The combination of claim 15 further comprising at least one transversely-extending channel formed to extend across at least a portion of the sheet of translucent material proximate to the top edge surface of the keypad interface.

17. The combination of claim 16 wherein said at least one transversely-extending channel comprises a first transversely-extending channel formed to extend across at least a portion of a top surface of the sheet of translucent material and a second transversely-extending channel formed to extend across at least a portion of a bottom surface of the sheet of translucent material.

18. The combination of claim 15 wherein the keypad interface and said sheet of translucent material integrally molded therewith are comprised of a flexible, thermoelastic material.

19. In a radiotelephone having transceiver circuitry including circuit board-mounted circuitry operative to receive manually-input signals representative of a call sequence generated by way of a plurality of keypad pushbuttons integrally molded with a keypad interface, the keypad interface further having a face surface positioned in tandem with a face surface of the circuit board at which the circuitry operative to receive the manually-input signals is mounted, a combination with the transceiver circuitry and the keypad interface of an assembly for visually indicating selected signals generated by the transceiver circuitry, said assembly comprising:

at least two light-generative devices coupled to the transceiver circuitry and disposed upon the face surface of the circuit board at which the circuitry operative to receive the manually-input signals is disposed wherein a first light-generative device of the at least two light-generative devices is operative to turn-on when a first of the signals is generated by the transceiver circuitry and wherein a second light-generative device of the at least two light-generative devices is spaced-apart from the first of the light-generative devices and is operative to turn-on when a second of the signals is generated by the transceiver circuitry;

a sheet of translucent material integrally molded with the keypad interface and extending beyond a top edge surface thereof for positioning above the first and second light-generative devices, respectively , of the two at least two light-generative devices; and at least two spaced-apart, light diffusers intergrally molded with the translucent material comprising said sheet of translucent material and positioned to extend beyond a top surface of said sheet wherein a first light diffuser and a second light diffuser of said at least two light diffusers are spaced-apart by distances corresponding to distances at which the first and second light-generative devices, respectively, are spaced-apart, thereby to permit alignment of the first light diffuser with the first light-generative device and alignment of the second light diffuser with the second light-generative device such that light and second light-generative devices, respectively, are diffused by corresponding ones of the first and second light diffusers; and a housing for housing the circuit board having circuit board-mounted circuitry operative to receive the manually-input signals therewithin, and for supporting the keypad interface, and the sheet of translucent material integrally molded therewith, in tandem with the face surface of the circuit board.

20. An interface apparatus for a radio transceiver having transceiver cicuitry mounted upon a circuit board operative to receive manually-input signals representative of a call sequence at spaced locations forming an array of locations upon a face surface of the circuit board, and light-generative devices formed along a top edge portion of the face surface of the circuit board for indicating output signals generated by the transceiver circuitry, said interface apparatus comprising:

a keypad formed of a thermoelastic material and having intergally molded therwith a plurality of keypad pushbuttons positioned at spaced locations forming an array of keypad pushbuttons corresponding to the array of locations formed upon the face surface of the circuit board such that positioning of the keypad upon the face surface of the circuit board aligns array of keypad pushbuttons with the array of locations formed upon the face surface of the circuit board wherein actuation of individual ones of the keypad pushbuttons form the manually-input signals representative of a call sequence; extending beyond as top edge surface thereof for positioning above the light-generative devices formed along the top edge portion of the face surface of the circuit board when said keypad is positioned upon the face of the circuit board to align the array of keypad pushbuttons with the array of locations formed upon the face surface of the circuit board; and a plurality of light diffusers integrally molded with the translucent material comprising said sheet of translucent material, each light diffuser of said plurality being positioned to the extend beyond a top surface of said sheet an d spaced-apart from adjacent ones of the light diffusers by distances corresponding to distances separating adjacent ones of the light-generative devices formed along the top edge of the face surface of the circuit board wherein, when the keypad is positioned upon the face surface of the circuit board, individual ones of the plurality of light diffusers are positioned above corresponding ones of the light-generative devices to diffuse light generated therefrom.

\* \* \* \* \*

UNITED STATES PATENT AND TRADEMARK OFFICE
CERTIFICATE OF CORRECTION

PATENT NO. : 5,577,267
DATED : Nov. 19, 1996
INVENTOR(S) : Jungles-Butler, et al.

It is certified that error appears in the above-indentified patent and that said Letters Patent is hereby corrected as shown below:

Claim 20, Column 12, line 38, after "sequence;" insert new paragraph:
--a sheet of translucent material integrally molded with the keypad and-- extending Signed and Sealed this Eighth Day of April, 1997

Attest:

BRUCE LEHMAN

Attesting Officer

Commissioner of Patents and Trademarks